US009298620B2

(12) United States Patent
Kannan et al.

(10) Patent No.: US 9,298,620 B2
(45) Date of Patent: Mar. 29, 2016

(54) SELECTIVE VICTIMIZATION IN A MULTI-LEVEL CACHE HIERARCHY

(71) Applicant: Apple Inc., Cupertino, CA (US)

(72) Inventors: Hari S. Kannan, Sunnyvale, CA (US);
Brian P. Lilly, San Francisco, CA (US);
Perumal R. Subramoniam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 14/088,980

(22) Filed: Nov. 25, 2013

(65) Prior Publication Data

US 2015/0149721 A1   May 28, 2015

(51) Int. Cl.
*G06F 12/08* (2006.01)

(52) U.S. Cl.
CPC ........ *G06F 12/0811* (2013.01); *G06F 12/0804* (2013.01); *G06F 12/0864* (2013.01); *G06F 12/0888* (2013.01); *G06F 12/0891* (2013.01)

(58) Field of Classification Search
CPC ............ G06F 12/0811; G06F 12/0864; G06F 12/0804; G06F 12/0888; G06F 12/0891
See application file for complete search history.

(56) References Cited

U.S. PATENT DOCUMENTS

| 5,802,572 A * | 9/1998 | Patel .................... G06F 12/0815 711/128 |
| 7,360,015 B2 | 4/2008 | Matthews et al. |
| 7,937,552 B2 | 5/2011 | Maier et al. |
| 2002/0065992 A1* | 5/2002 | Chauvel .................. G06F 1/206 711/141 |
| 2008/0072004 A1* | 3/2008 | Kershaw ............. G06F 12/1491 711/163 |
| 2008/0256306 A1 | 10/2008 | Warner et al. |
| 2009/0254712 A1* | 10/2009 | Cherukuri ........... G06F 12/0811 711/141 |
| 2012/0317362 A1 | 12/2012 | Hendry et al. |

* cited by examiner

*Primary Examiner* — Hiep Nguyen
(74) *Attorney, Agent, or Firm* — Rory D. Rankin; Meyertons, Hood, Kivlin, Kowert & Goetzel, P.C.

(57) ABSTRACT

Systems, methods, and apparatuses for implementing selective victimization to reduce power and utilized bandwidth in a multi-level cache hierarchy. Each set of an upper-level cache includes a counter that keeps track of the number of times the set was accessed. These counters are periodically decremented by another counter that tracks the total number of accesses to the cache. If a given set counter is below a certain threshold value, clean victims are dropped from this given set instead of being sent to a lower-level cache. Also, a separate counter is used to track the total number of outstanding requests for the cache as a proxy for bus-bandwidth in order to gauge the total amount of traffic in the system. The cache will implement selective victimization whenever there is a large amount of traffic in the system.

20 Claims, 8 Drawing Sheets

SELECTIVE VICTIMIZATION IN A MULTI-LEVEL CACHE HIERARCHY

BACKGROUND

1. Field of the Invention

The present invention relates generally to data caches, and in particular to methods and mechanisms for reducing the number of clean victim writebacks from a data cache.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the requesting agent.

Conventional caches are typically coupled to or nearby an agent and store data that is frequently accessed by the agent to reduce latency. For example, processor cores often include caches and may also be coupled to additional external caches in a cache memory hierarchy. In one embodiment, a system may include a processor, and the processor may include one or more level one (L1) caches, and the processor may be coupled to a level two (L2) cache. The system may also include a non-inclusive level three (L3) cache which is a victim cache for the write-back L2 cache. In such a system, capacity evictions from the L2 cache are sent to the L3 cache to be cached for future accesses. However, sending all capacity evictions diminishes the utility of the victim cache, increases the power consumed by the system, and decreases bandwidth availability for other agents.

SUMMARY

Systems, apparatuses, and methods for reducing the number of clean-victim write-backs from a cache are disclosed.

In one embodiment, a system may include a multi-level cache hierarchy. The cache hierarchy may include one or more level one (L1) caches, a level two (L2) cache, and a level three (L3) cache. The L3 cache may be non-inclusive victim cache for the L2 cache. The L2 cache may be configured to implement various techniques for reducing the number of clean-victim write-backs to the L3 cache. For example, the L2 cache may identify situations when the L2 cache is not being thrashed, and for these situations, the L2 cache may drop clean victims rather than writing them back to the L3 cache.

In one embodiment, the L2 cache may be a set associative cache. Each set of the L2 cache may have a counter which keeps track of the number of times the set was accessed. When a cache line is evicted from the L2 cache, if the corresponding set counter is above a threshold, the cache line may be written back to the L3 cache. If the corresponding set counter is below a threshold, then the cache line may be dropped and not written back to the L3 cache. These counters may be periodically decayed by another counter which tracks the total number of accesses to the cache.

In one embodiment, the total number of outstanding requests for the L2 cache may be tracked to gauge the total amount of traffic in the system. If the number of outstanding requests is above a given threshold, then the L2 cache may implement selective victimization. Otherwise, if the number of outstanding requests is below the given threshold, the L2 cache may write back all clean victims to the L3 cache.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
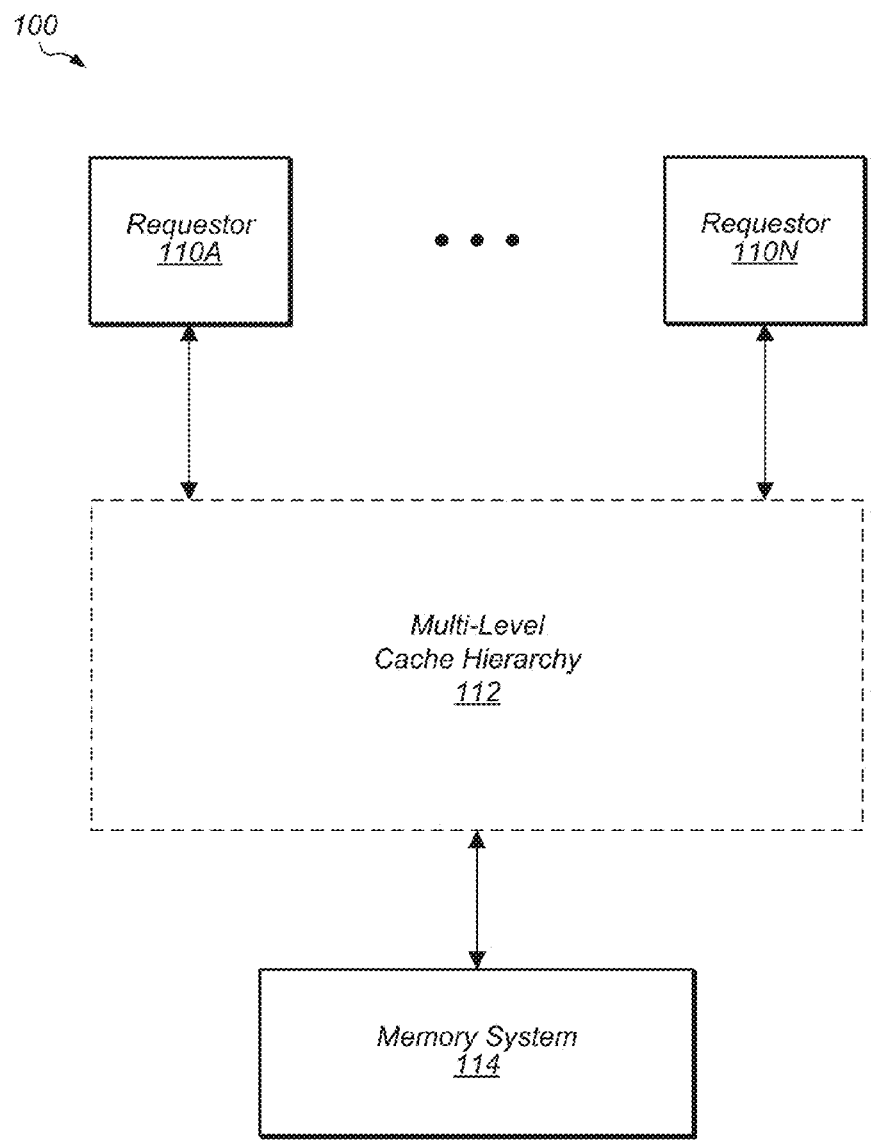
FIG. 1 is a block diagram that illustrates one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a first cache . . . ." Such a claim does not foreclose the system from including additional components (e.g., a processor complex, a coherence point, a GPU).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines. In another example, the terms "first" and "second" memory requests can be used to refer to any two memory requests.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 including one or more requestors 110A-110N, a multi-level cache hierarchy 112, and a memory system 114 is shown. The requestors 110A-110N are coupled to the multi-level cache hierarchy 112, which is further coupled to the memory system 114. The multi-level cache hierarchy 112 may include any number of cache levels depending on the embodiment. Multi-level cache hierarchy 112 is coupled to transmit data to, and receive data from, the memory system 114 and requestors 110A-110N. Although multi-level cache hierarchy 112 is shown as being separate from requestors 110A-110N, it is noted that one or more cache levels may be included as part of a given requestor. For example, a requestor (e.g., processor) may include one or more level one (L1) cache(s) which are coupled to a level two (L2) cache which is shared by more than one requestor. Additionally, in some embodiments, a memory controller cache may be included as part of memory system 114, and the memory controller cache may be coupled to a higher level cache in multi-level cache hierarchy 112.

Each requestor 110A-110N is configured to transmit requests to the multi-level cache hierarchy 112. Each request may include an address and various other attributes. The requestors 110A-110N may be configured to perform various operations in the system, and may access memory as part of their operation. For example, the requestors 110A-110N may be processors, such as general purpose processors or special purpose processors (e.g., graphics processors). The processors may be configured to access memory to fetch instructions for execution, and may also be configured to access various data operands of the instructions in memory in response to executing the instructions. Other requestors may include fixed function circuitry (e.g. DMA controllers, peripheral interface controllers). The requestors 110A-110N may be physically separate circuitry (e.g., each requestor 110A-110N may be a separate instance of a processor). Alternatively, a requestor may be a logical entity such as a process or thread executing on a processor, such that a single physical processor may include multiple logical requestors.

In one embodiment, a given requestor (physical or logical) may be identified by a requestor identifier (ID). For example, the requestor ID may be an identifier used by a processor as an identifier on an interface to which the multi-level cache hierarchy 112 may also be coupled. Alternatively, the requestor ID may be a thread identifier (TID) assigned to a thread by the operating system that manages the threads/processes. The number of requestors 110A-110N included in a given embodiment may vary, from one to any number of requestors.

The requestors 110A-110N may be configured to generate requests to access memory. The requests may include an address and other attributes including a size of the request (e.g. in number of bytes), a read/write indication identifying the request as a read or write request, cacheability attributes (e.g. non-cacheable, cacheable writethrough, cacheable write back, etc.), the requestor ID, etc.

The requestors 110A-110N may be configured to transmit requests to multi-level cache hierarchy 112. In one embodiment, each requestor 110A-110N may have a dedicated port assigned to it to a given cache of multi-level cache hierarchy 112. Other embodiments may implement shared ports along with arbitration circuitry to arbitrate among the requests. Still other embodiments may include the multi-level cache hierarchy 112 and the requestors 110A-110N coupled to an interface (e.g. a bus or a packet interface), and the requests may be transmitted over the interface. Various mechanisms for parallel transmission and/or arbitration of requests on the interface may be used in such embodiments.

One or more of the caches in multi-level cache hierarchy 112 may be configured to detect when a thrash condition is present in the cache. As used herein, the term "thrashing" is defined as the occurrence of cache access patterns where main memory is accessed in a manner that leads to multiple main memory locations competing for the same cache lines, resulting in excessive cache misses. For example, thrashing occurs between multiple cache lines which are mapped to a single entry or to a small set of oversubscribed entries. In one embodiment, when a given cache detects a thrash condition is present, the cache may write back clean victims to a lower level cache. If the given cache detects that a thrash condition is not present, then the cache may drop clean victims rather than writing them back to the lower level cache. As used herein, the term "victim" refers to a cache line which is evicted from a cache because the associated location in the cache is being allocated to another cache line. The term "clean" when applied to a victim indicates that the value of the victim matches the value of the cache line in lower levels of the cache hierarchy or memory. In other words, a "clean" cache line is a cache line that has not been modified by the cache. The given cache may also make the decision to drop clean victims contingent on one or more other conditions related to the status of the given cache, other caches in multi-level cache hierarchy 112, and/or other components within overall system 100.

One or more caches in the multi-level cache hierarchy 112 may be associative, in which a given address maps to two or more cache block storage locations in the cache that may be eligible to store the cache block (so that it may be found on a subsequent access). One or more of the caches in the multi-level cache hierarchy 112 may be set associative, in which N cache block storage locations are mapped to addresses having the same value in a subset of the address bits referred to as an index, where N is an integer greater than one and less than the total number of cache block storage locations in the cache. The N cache block storage locations forming a set corresponding to a given index are often referred to as "ways". Other caches in other embodiments may be fully associative, in which any cache block storage location may be mapped to any address.

The memory system 114 may comprise any type of RAM memory. The memory system 114 may include additional levels of caching beneath the multi-level cache hierarchy 112, if desired, and may include a memory controller and memory. The memory may be dynamic RAM (DRAM), such as synchronous DRAM (SDRAM), double data rate DRAM (DDR SDRAM, DDR2 SDRAM, DDR3 SDRAM, etc., including mobile versions of the SDRAMs such as mDDR3), RAMBUS DRAM (RDRAM), SRAM, etc.

The interface between the multi-level cache hierarchy 112 and the memory system 114 may include any type of interface (bus-based, packet-based, etc.). There may be other devices that communicate with the memory system 114 as well. The multi-level cache hierarchy 112 may be configured to transmit fill requests to read a missing cache block from the memory system 114, and may be configured to transmit write back requests to write a modified, evicted cache block back to the memory system 114.

It is noted that, in some embodiments, one or more of the components illustrated in FIG. 1 may be integrated onto a single semiconductor substrate as in integrated circuit "chip" with any other components shown in FIG. 1 and/or other components. Any level of integration or discrete implementation may be used. For example, in an embodiment the requestors 110A-110N and the multi-level cache hierarchy 112 may be integrated, and in an embodiment the memory controller of the memory system 114 may be integrated.

Figure 2:
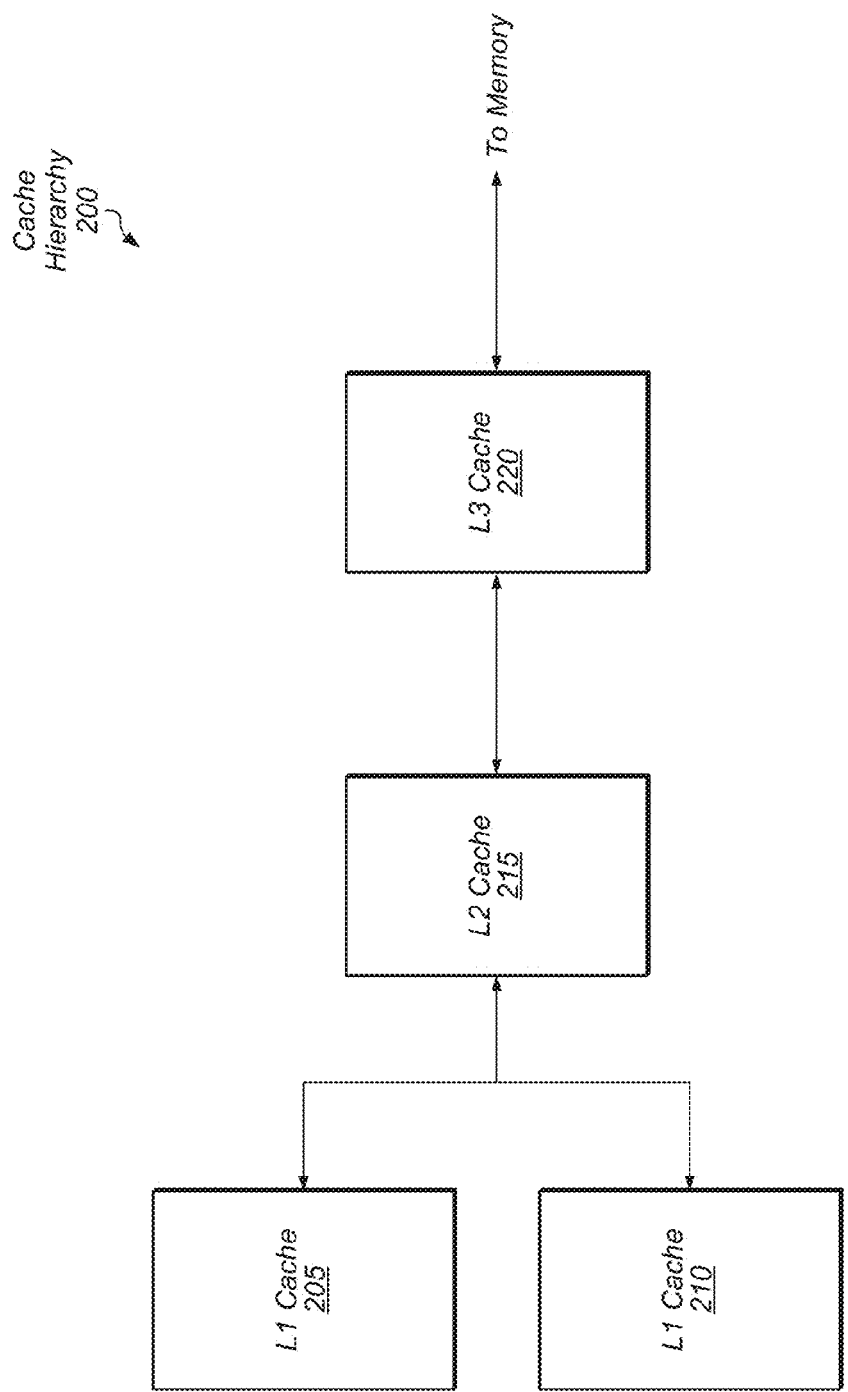
FIG. 2 illustrates one embodiment of a cache hierarchy.

Turning now to FIG. 2, one embodiment of a cache hierarchy is shown. Cache hierarchy 200 may include L1 caches 205 and 210, L2 cache 215, and level three (L3) cache 220. It is noted that although L3 cache 220 is shown as being coupled directly to memory, in some embodiments, L3 cache 220 may be coupled to memory via one or more other components (e.g., coherence point, memory controller) not shown in FIG. 2. Similarly, in some embodiments, L2 cache 215 may be coupled to L3 cache 220 via one or more other components not shown in FIG. 2. It is also noted that there may be one or more lower levels of cache coupled between L3 cache 210 and memory. Caches (e.g., L1 caches 205 and 210) that are closer to a requesting agent (e.g., processor) may be referred to as being higher in the cache hierarchy 200 than the caches that are farther from the requesting agent. Similarly, caches (e.g., L3 cache 220) that are farther from the requesting agent (and closer to memory) may be viewed as being lower in the cache hierarchy 200. It is noted that in some embodiments, L3 cache 220 may actually be a memory controller cache.

In one embodiment, L3 cache 220 may be a non-inclusive victim cache for L2 cache 215. When L2 cache 215 detects a cache miss for a given request, L2 cache 215 may allocate a cache line storage location to store the cache line accessed by the given request. If the existing cache line has a clean (i.e., unmodified) status, L2 cache 215 may determine whether or not to drop this cache line based on a variety of status indicators. For example, in one embodiment, if L2 cache 215 determines that a thrash condition is present for this cache line storage location, then L2 cache 215 may write back the cache line to L3 cache 220. If a thrash condition is not present for this cache line storage location, then L2 cache 215 may drop the cache line.

In another embodiment, L2 cache 215 may maintain a counter to track the number of outstanding requests for L2 cache 215. This counter may serve as an indicator of the amount of traffic within the cache hierarchy 200. In other embodiments, other indicators may be used as a proxy for the amount of traffic within the cache hierarchy 200. If the value of this counter is above a certain threshold, then L2 cache 215 may implement the selective victimization techniques described herein. In other words, if there is a large amount of traffic in the system, then it may be beneficial to reduce the number of clean victims which are written back to L3 cache 220. Otherwise, if the value of this counter is below the threshold, then L2 cache 215 may write back all clean victims to L3 cache 220. In other words, if there is a low amount of traffic in the system, then clean victim traffic may be increased since it will likely not interfere with other traffic.

L2 cache 215 may utilize any of a variety of techniques for determining when a thrash condition is present for a given cache line storage location. For example, in one embodiment, L2 cache 215 may be set associative, and L2 cache 215 may maintain a counter for each set to track the number of accesses (reads and writes) made to the set. L2 cache 215 may also maintain another counter to track the number of accesses (reads and writes) made to the entire L2 cache 215. When this counter for the entire L2 cache 215 expires (or reaches a predetermined value), each of the set counters may be decremented by a fixed amount. In another embodiment, L2 cache 215 may be divided into chunks, and each chunk may have a separate counter to track the number of accesses (reads and writes) made to the chunk. When a chunk counter expires (or reaches a predetermined value), then each of the set counters may be decremented by a fixed amount.

When a clean victim is evicted from L2 cache 215, the counter corresponding to the set from which the clean victim was evicted may be queried to determine if a thrash condition is present for this set. If the counter corresponding to this set is above a given threshold, L2 cache 215 may conclude that a thrash condition is present for this set. Otherwise, if the counter corresponding to this set is below the given threshold, L2 cache 215 may conclude that a thrash condition is not present for this set.

It is noted that the cache hierarchy 200 shown in FIG. 2 is merely one example of a cache hierarchy that may be utilized in various systems. In other embodiments, cache hierarchy 200 may include other numbers and/or levels of caches. It is also noted that other caches besides L2 cache 215 in the cache hierarchy 200 may utilize the techniques described above for determining whether to implement selective victimization.

In various embodiments, cache hierarchy 200 may be included within a system on chip (SoC). The SoC may also include many other components (e.g., switch fabric, processor(s), GPU, memory controller, and memory physical interface circuits) not shown in FIG. 2. In various embodiments, the SoC may also be referred to as an integrated circuit (IC), an application specific integrated circuit (ASIC), or an apparatus.

Figure 3:
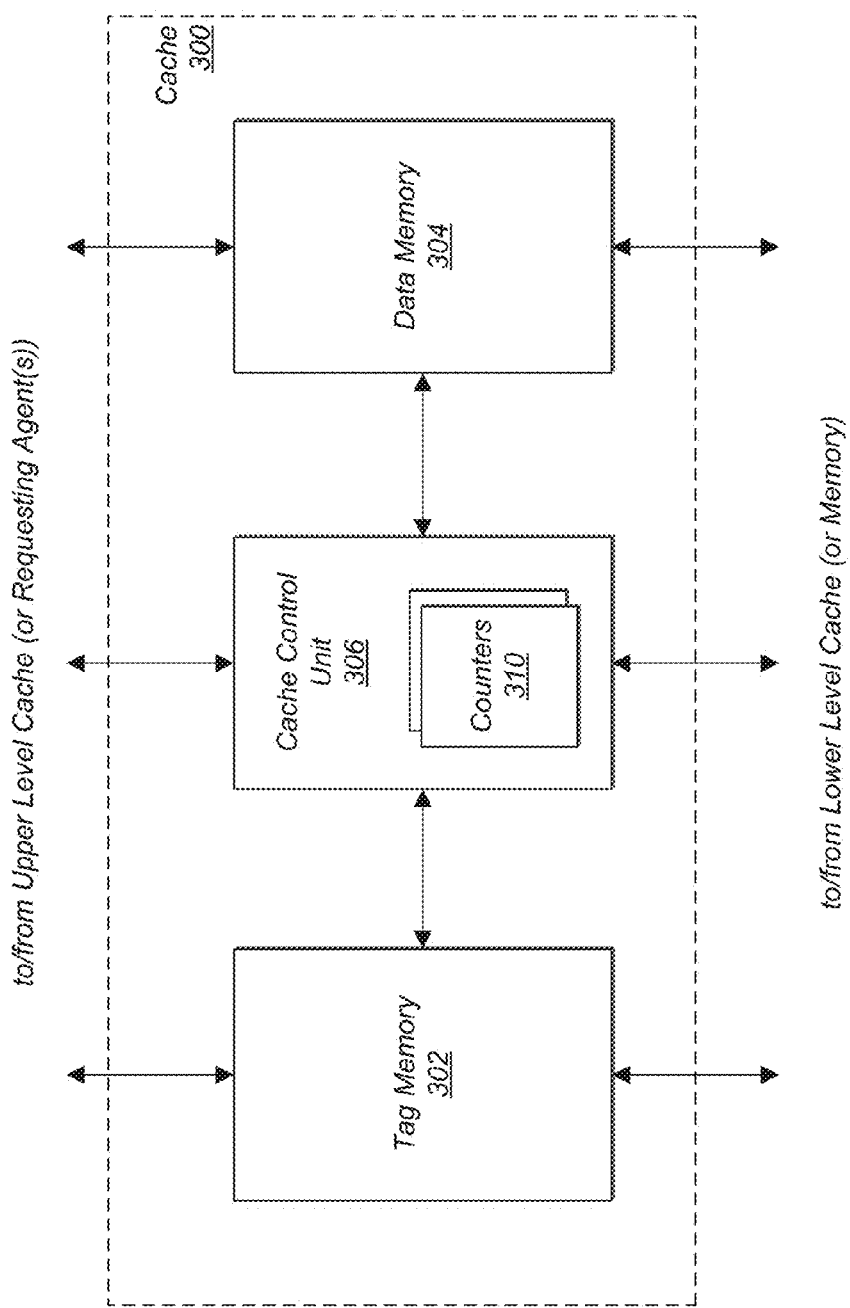
FIG. 3 is a block diagram illustrating one embodiment of a cache.

Referring now to FIG. 3, a block diagram of one embodiment of a cache is shown. Cache 300 may be a L1 cache, L2 cache, L3 cache, or other cache, depending on the embodiment. In one embodiment, cache 300 may include tag memory 302, data memory 304, and cache control unit 306. It is noted that cache 300 may also include other components and logic not shown in FIG. 3. For example, cache 300 may also include arbitration circuitry to arbitrate among requests. It is to be understood that the cache architecture shown in FIG. 3 is merely one possible architecture that may be implemented. In other embodiments, other cache architectures may be utilized with the methods and mechanisms disclosed herein.

In one embodiment, tag memory 302 may be coupled to receive addresses for memory requests from requesting agents (or other caches). Data memory 304 may be coupled to receive data or provide data for memory requests. Cache control unit 306 is coupled to tag memory 302 and data memory 304, and cache control unit 306 may be configured to receive various control data related to the received memory requests and to respond to the received control data. Cache control unit 306 may include a plurality of counters 310 for tracking various metrics related to the status and performance of cache 300. For example, counters 310 may include set access counters, an outstanding request counter, one or more chunk access counters, and various other counters. It is noted that although cache control unit 306 is shown in FIG. 3 as a single unit, in other embodiments, cache control unit 306 may be split up into multiple units within cache 300.

Data memory 304 may comprise a set of data entries, each having capacity to store a cache line of data. The cache line may be the unit of allocation and deallocation in data memory 304. The cache line may be any desirable size, such as 32 bytes or 64 bytes, although larger and smaller cache line sizes may be supported in other embodiments. It is noted that the cache lines of data memory 304 may also be referred to as "cache blocks".

In various embodiments, data memory 304 may utilize any type of memory device. In one embodiment, data memory 304 may comprise a RAM, for example, indexed by entry number. Data memory 304 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 306 (e.g., responsive to detecting a cache hit for a request, responsive to allocating the cache line storage location to store a missing cache line). Data may be read from the accessed cache line storage location to return to the requestor for a read cache hit, or to transmit to the memory (or a lower level cache) for a cache line evicted from cache 300. Data may be written to the accessed cache line storage location for a write cache hit from a requestor or to complete a cache fill of a missing cache line into an allocated cache line storage location. In some embodiments, data memory 304 may be a banked implementation and bank selection control may be provided from the cache control unit 306 as well.

Tag memory 302 may utilize any type of memory device, such as for instance, a RAM. Alternatively, tag memory 302 may comprise a content addressable memory (CAM) for snooping purposes, or a RAM/CAM combination. The tag memory 302 may comprise a plurality of tag entries, each entry selected by a different value of the index mentioned above. The selected tag entry may store the tags that correspond to the set of cache line storage locations in cache 300 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information.

In response to a request, the tag memory 302 may be configured to decode the index and output the tags to the cache control unit 306 for processing. In an embodiment, the tag memory 302 may also include tag comparison circuitry configured to compare the tags to the tag portion of the request address, and may provide the comparison results to the cache control unit 306. In another embodiment, the cache control unit 306 may compare the tags. The cache control unit 306 may also be configured to perform various tag updates by writing the tag entry.

Cache 300 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 302 and data memory 304) in cache 300, at which the corresponding cache line would be stored. In one embodiment, cache 300 may be associative, in which a given address maps to two or more cache line storage locations in the data memory 304 that may be eligible to store the cache line. Cache 300 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 304. The N cache line storage locations forming a set corresponding to a given index are often referred to as "ways". Other embodiments may be fully associative, in which any cache line storage location may be mapped to any address.

Cache control unit 306 may dynamically allocate a data entry in data memory 304 to store data for a memory request received by cache 300. The memory request may be a write to memory, for example. The memory request may also be a read completion (with data) provided from the memory (not shown) in response to a read previously received from a requesting agent and targeting the memory.

Tag memory 302 may be configured to store various tags for the cache lines cached in the cache 300. For example, in one embodiment, the tags may include the coherence state, a dirty indicator, least recently used (LRU) data, a group identification (ID), a requesting agent ID, and/or other data. Depending on the embodiment, some or all of these tags may be included in each entry of tag memory 302.

Figure 4:
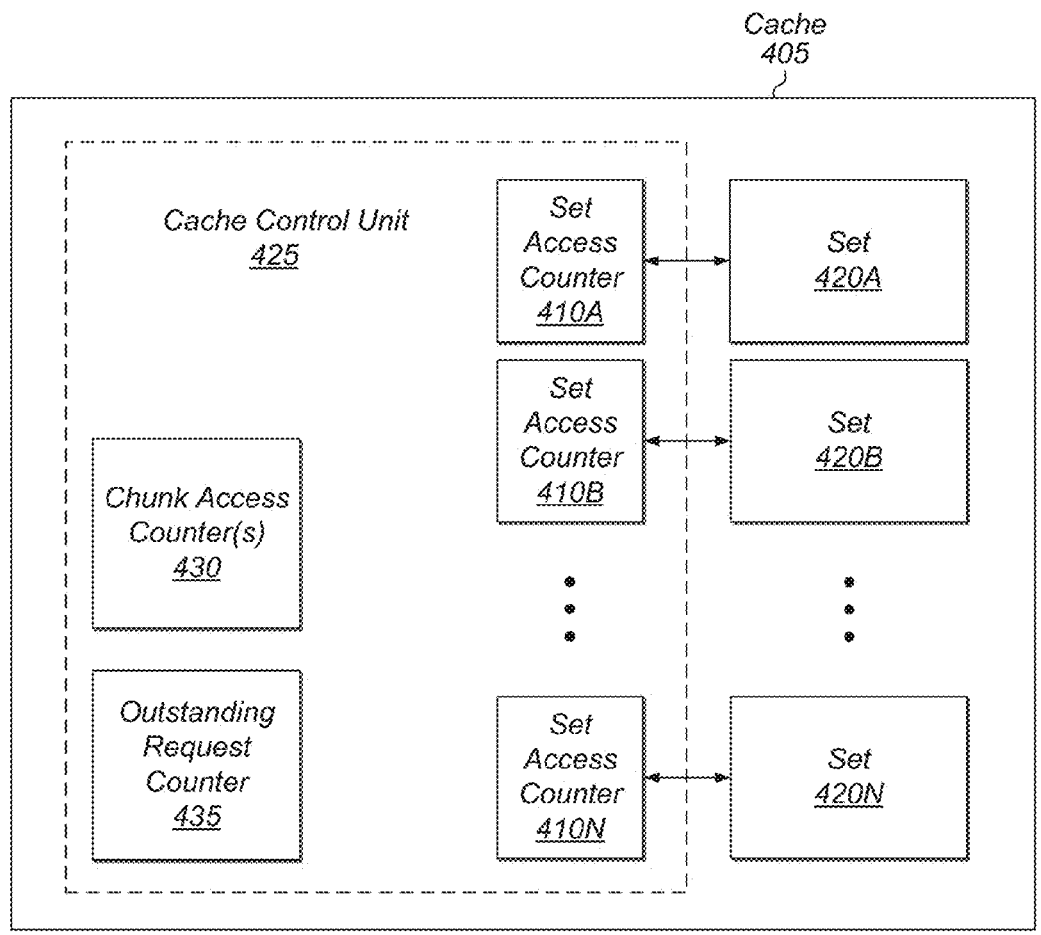
FIG. 4 is a block diagram illustrating another embodiment of a cache.

Turning now to FIG. 4, a block diagram of another embodiment of a cache is shown. Cache 405 includes cache control unit 425 and sets 420A-N. For the purposes of this discussion, it may be assumed that cache 405 is set associative. Sets 420A-N are representative of any number of sets of cache 405, wherein each set 420 includes a plurality of ways. Each set 420A-N corresponds to a single index value from the tag and data memories of cache 405, such that the address for a given request maps to only a single set out of sets 420A-N. For example, in one embodiment, cache 405 may be an 8-way set associative cache, and each set 420A-N may include 8 ways. Cache 405 may be any of the different types of caches (e.g., L1 cache, L2 cache, L3 cache, memory controller cache) described herein, and furthermore, cache 405 may be included in any of the systems described herein.

Cache control unit 425 may include set access counters 410A-N, and each counter 410A-N may track the number of accesses made to a corresponding set of sets 420A-N. An access refers to a read or write to any of the ways of the corresponding set. Cache control unit 425 may also include chunk access counter(s) 430. In one embodiment, cache 405 may be divided into a plurality of chunks, and there may be a chunk access counter 430 for each chunk of cache 405. Each chunk access counter 430 may track the number of accesses made to a corresponding chunk of cache 405. Alternatively, in another embodiment, cache 405 may not be divided into a plurality of chunks, and instead cache 405 may be considered as a single chunk. In this embodiment, there may be a single chunk access counter 430 which tracks the total number of accesses made to the entire cache 405. When a given chunk access counter 430 reaches a predetermined threshold (or expires), then the given chunk access counter 430 may be reset and each set access counter 410A-N may be decremented by a fixed value. In one embodiment, only those set access counters 410A-N which correspond to sets in the chunk of the given chunk access counter 430 may be decremented by the fixed value when the given chunk access counter 430 reaches the predetermined threshold.

Cache control unit 425 may also include outstanding request counter 435. Outstanding request counter 435 may track the total number of outstanding requests for cache 405. Cache control unit 425 may use the total number of outstanding requests as a proxy for memory bus bandwidth so as to gauge the total amount of traffic in the system. In some embodiments, cache control unit 425 may decide to use selective victimization only when there is a large amount of traffic in the system. In these embodiments, cache control unit 425 may write back all clean victims to a lower level cache if there is a low amount of traffic in the system. For example, in one embodiment, cache control unit 425 may drop a clean victim evicted from a set 420A if the corresponding counter 410A is less than a first threshold value and if outstanding request counter 435 is greater than a second threshold value. Otherwise, cache control unit 425 may write back the clean victim to the lower level cache if the corresponding counter 410A is greater than the first threshold value or if outstanding request counter 435 is less than the second threshold value.

In other embodiments, cache control unit 425 may use different criteria for determining when to drop clean victims from a given set. For example, in another embodiment, cache control unit 425 may drop a clean victim evicted from a set 420A if the corresponding counter 410A is less than the first threshold value without checking the value of outstanding request counter 435. In a further embodiment, cache control unit 425 may drop a clean victim evicted from a set 420A if outstanding request counter 435 is greater than the second threshold value without checking the value of counter 410A.

Figure 5:
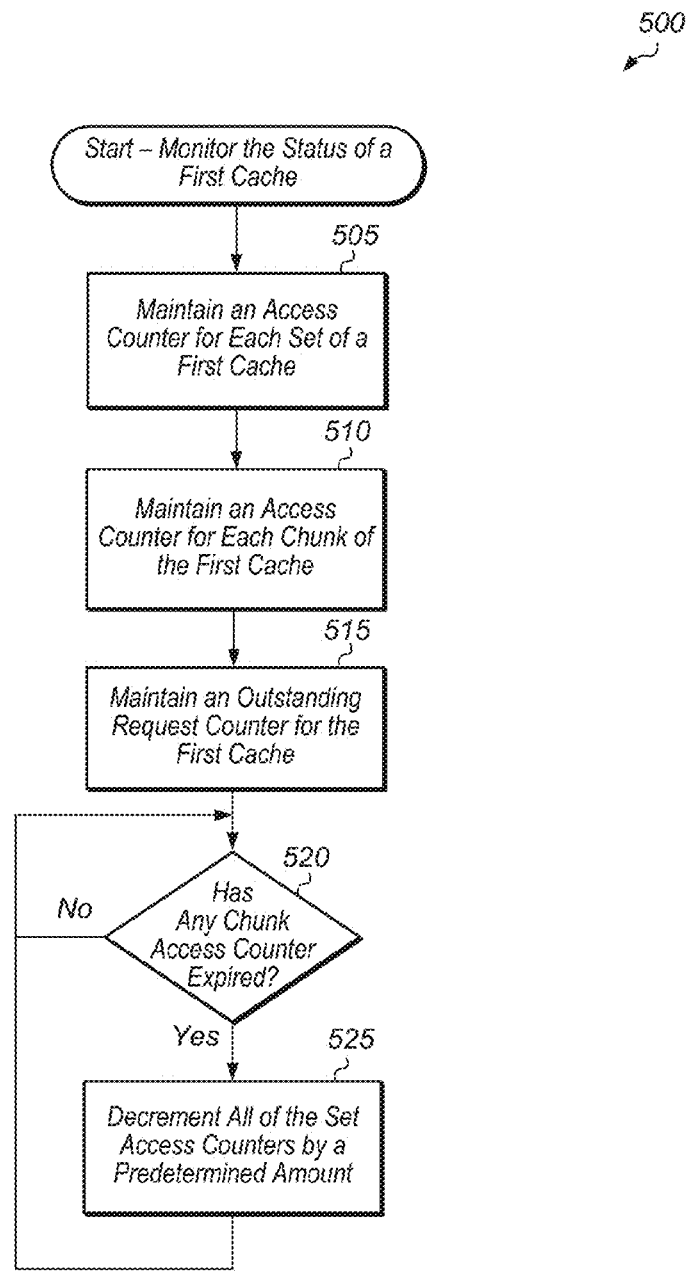
FIG. 5 is a generalized flow diagram illustrating one embodiment of a method for monitoring the status of a cache.

Referring now to FIG. 5, one embodiment of a method 500 for monitoring the status of a first cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Blocks may be performed in parallel in combinatorial logic circuitry in any of the caches or cache control units described herein. Blocks, combinations of blocks, and/or the flowchart as a whole may be pipelined over multiple clock cycles. Any cache or cache control unit described herein may be configured to implement the operations shown in FIG. 5.

An access counter may be maintained for each set of a first cache (block 505). Each access counter may count the number of accesses that are made to its corresponding set. The first cache may be a set associative cache with any number of sets and any number of ways, depending on the embodiment. Also, an access counter may be maintained for each chunk of the first cache (block 510). The first cache may be divided into various numbers of chunks, depending on the embodiment. Each access counter may count the number of accesses that are made to its corresponding chunk. Alternatively, the first cache may not be divided into chunks, and only a single access counter for the whole cache may be maintained which tracks the number of accesses made to the entire first cache. Also, an outstanding request counter may be maintained for the first cache (block 515). The outstanding request counter may track the number of requests (to lower level caches or memory) made by the first cache which have not yet been completed.

The first cache may determine if any of the chunk access counters have expired (or exceeded their corresponding thresholds) (conditional block 520). If any chunk access counter has expired (conditional block 520, "yes" leg), then all of the set access counters may be decremented by a predetermined amount (block 525). After block 525, the first cache may continue to monitor the chunk access counters (conditional block 520). If none of the chunk access counters have exceeding their corresponding thresholds (conditional block 520, "no" leg), then the first cache may continue to monitor the chunk access counters (conditional block 520).

Figure 6:
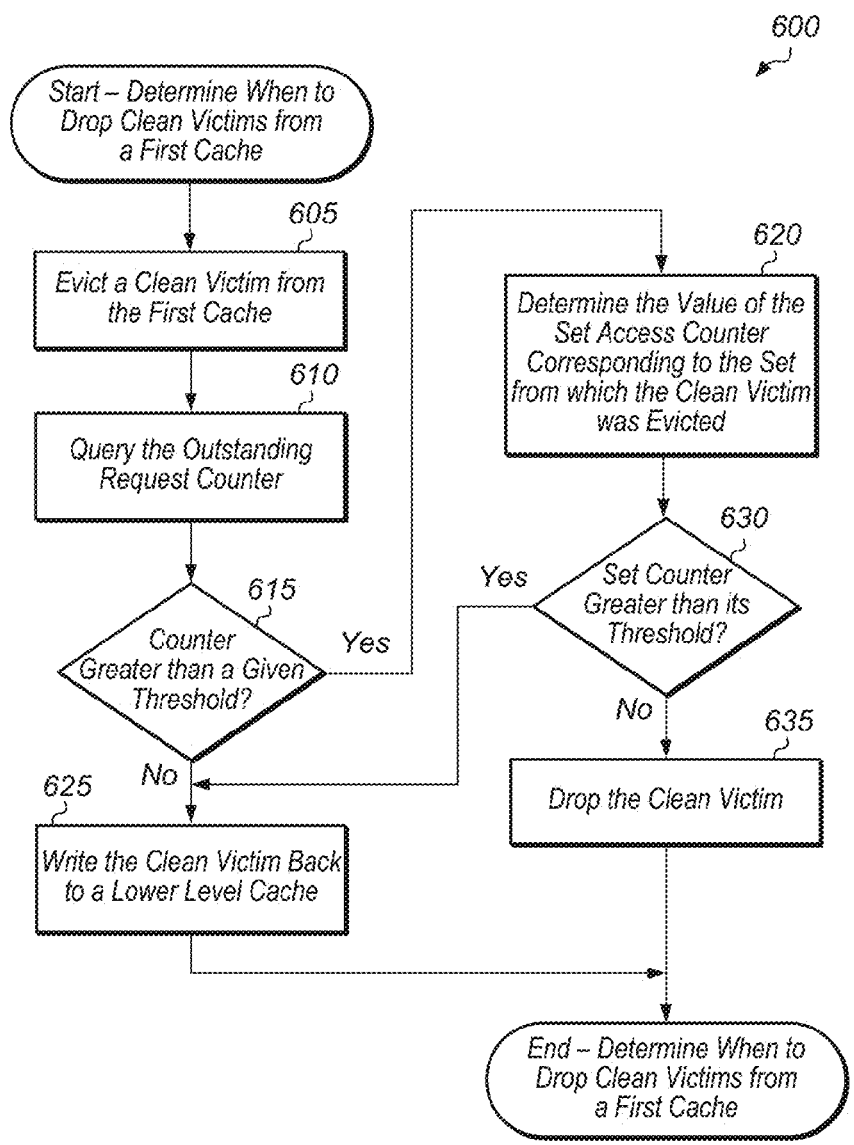
FIG. 6 is a generalized flow diagram illustrating one embodiment of a method for determining when to drop clean victims from a cache.

Turning now to FIG. 6, one embodiment of a method 600 for determining when to drop clean victims from a first cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Blocks may be performed in parallel in combinatorial logic circuitry in any of the caches or cache control units described herein. Blocks, combinations of blocks, and/or the flowchart as a whole may be pipelined over multiple clock cycles. Any cache or cache control unit described herein may be configured to implement the operations shown in FIG. 6.

A first cache may decide to evict a clean victim (block 605). The decision to evict the clean victim may be made for a variety of reasons. In a typical scenario, the first cache may allocate a cache line storage location in response to detecting a miss for a given request, and the first cache may evict the existing cache line from this cache line storage location. It may be assumed for the purposes of this discussion that the existing cache line is in a clean state. The first cache may be any type of cache (e.g., L1 cache, L2 cache, L3 cache) depending on the embodiment.

In response to evicting a clean victim, the first cache may query the outstanding request counter (block 610). The outstanding request counter may track the number of outstanding requests of the first cache. The value of the outstanding request counter may serve as a metric to indicate the amount of request traffic being generated by the first cache. If the outstanding request counter is higher than a given threshold (conditional block 615, "yes" leg), then the first cache may determine the value of the set access counter corresponding to the set from which the clean victim was evicted (block 620). If the outstanding request counter is below the given threshold (conditional block 615, "no" leg), then the first cache may write the clean victim back to a lower-level cache (block 625). The lower-level cache may be the cache directly below the first cache in the multi-level cache hierarchy. For example, if the first cache is a L2 cache, then the clean victim may be written back to a L3 cache. In another embodiment, the first cache may not query the outstanding request counter, but rather may skip blocks 610 and 615 and go straight from block 605 to block 620. For example, in some embodiments, an outstanding request counter may not be utilized by the first cache, or the outstanding request counter may only be queried in certain situations.

After block 620, if the value of the set access counter corresponding to the set from which the clean victim was evicted is greater than a predetermined threshold (conditional block 630, "yes" leg), then the first cache may write the clean victim back to the lower-level cache (block 625). If the value of the set counter is greater than its threshold, this indicates that the set from which the clean victim was evicted is experiencing a high access rate and is being thrashed. Therefore, clean victims from this set should be written back to the lower-level cache. If the value of the set access counter corresponding to the set from which the clean victim was evicted is less than the predetermined threshold (conditional block 630, "no" leg), then the first cache may drop the clean victim rather than write it back to the lower-level cache (block 635). If the set counter is less than its threshold, this indicates that the set is experiencing a low access rate and is not being thrashed. Therefore, clean victims from this set can be dropped since there is a low probability they will be accessed again in the near future. It is noted that method 500 and method 600 may be executed concurrently. In other words, the counters maintained in method 500 may be used to determine how clean victims are processed in method 600.

Figure 7:
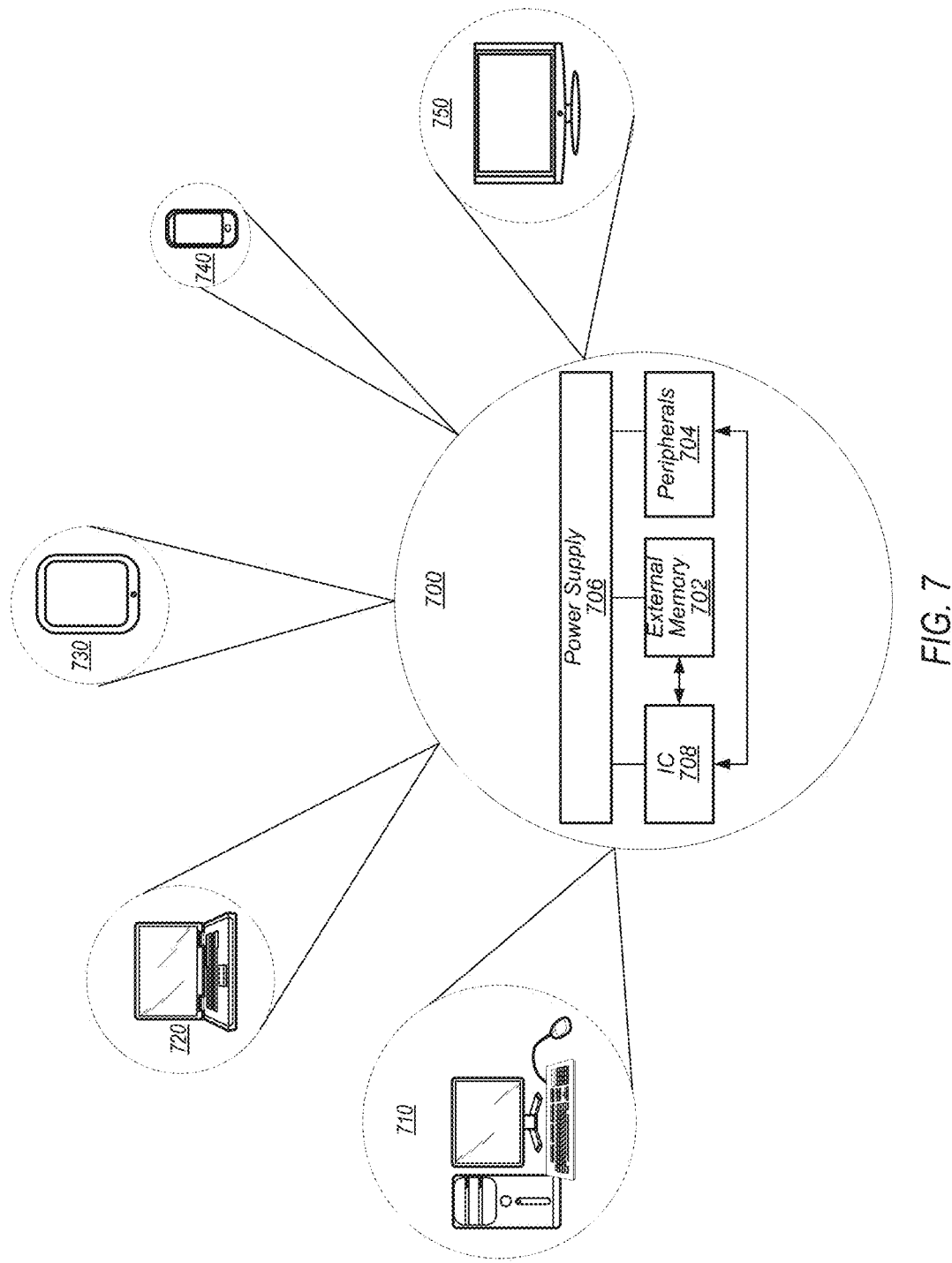
FIG. 7 is a block diagram of one embodiment of a system.

Referring next to FIG. 7, a block diagram of one embodiment of a system 700 is shown. As shown, system 700 may represent chip, circuitry, components, etc., of a desktop computer 710, laptop computer 720, tablet computer 730, cell phone 740, television 750 (or set top box configured to be coupled to a television), or otherwise. Other devices are possible and are contemplated. The system 700 may be another embodiment of the system illustrated in FIG. 1. In the illustrated embodiment, the system 700 includes at least one instance of integrated circuit (IC) 708 coupled to an external memory 702. IC 708 may include the requestors 110A-N, multi-level cache hierarchy 112, and the memory controller from the memory system 114, in one embodiment.

IC 708 is coupled to one or more peripherals 704 and the external memory 702, which may include the memory from the memory system 114. A power supply 706 is also provided which supplies the supply voltages to IC 708 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of IC 708 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 708 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc.

Figure 8:
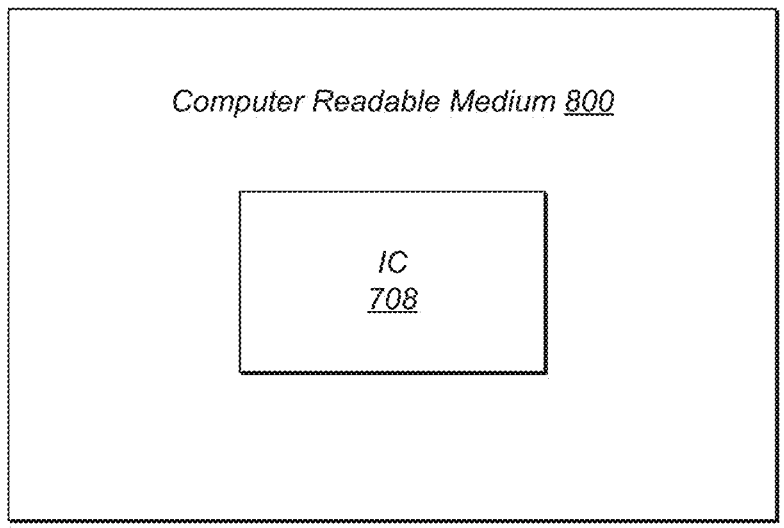
FIG. 8 is a block diagram of one embodiment of a computer readable medium.

Turning now to FIG. 8, one embodiment of a block diagram of a computer readable medium 800 including one or more data structures representative of the circuitry included in IC 708 (of FIG. 7) is shown. Generally speaking, computer readable medium 800 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 800 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 800 may be the netlist(s) (with or without the synthesis library) or the data set(s), as desired. In yet another alternative, the data structures may comprise the output of a schematic program, or netlist(s) or data set(s) derived therefrom.

While computer readable medium 800 includes a representation of IC 708, other embodiments may include a representation of any portion or combination of portions of IC 708 (e.g., cache control unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a first cache, wherein the first cache is set associative with a plurality of sets; and
   a second cache, wherein the second cache is at a lower level of a cache hierarchy than the first cache;
   wherein the first cache is configured to:
     maintain a counter for each set of the plurality of sets, wherein each counter tracks a number of accesses made to a corresponding set;
     responsive to evicting a clean victim from a first set:
       drop the clean victim responsive to detecting a first counter corresponding to the first set is less than a first threshold; and
       write back the clean victim to the second cache responsive to detecting the first counter is greater than the first threshold.

2. The system as recited in claim 1, wherein the first cache is further configured to decrement each counter by a predetermined amount responsive to determining a number of total accesses made to the first cache has exceeded a second threshold.

3. The system as recited in claim 2, wherein the first cache is further configured to maintain a counter for tracking the number of total accesses made to the first cache.

4. The system as recited in claim 1, wherein the first cache is further configured to:
maintain an outstanding request counter for tracking the number of outstanding requests of the first cache; and
write back the clean victim to the second cache responsive to determining the outstanding request counter is less than a second threshold.

5. The system as recited in claim 4, wherein the first cache is further configured to drop the clean victim responsive to determining the outstanding request counter is greater than the second threshold and the first counter corresponding to the first set is less than the first threshold.

6. The system as recited in claim 1, wherein the first cache is a level two (L2) cache, and wherein the second cache is a level three (L3) cache.

7. The system as recited in claim 1, wherein the first cache is a level one (L1) cache, and wherein the second cache is a level two (L2) cache.

8. A cache comprising:
a cache memory arranged as a set associative memory having a plurality of sets and a plurality of ways; and
a cache control unit coupled to the cache memory, wherein the cache control unit is configured to:
maintain a first counter, wherein the first counter tracks a number of accesses made to a first set;
responsive to evicting a first clean victim from the first set:
drop the first clean victim responsive to detecting the first counter is less than a first threshold; and
write back the first clean victim to a lower-level cache responsive to detecting the first counter is greater than the first threshold.

9. The cache as recited in claim 8, wherein the cache control unit is further configured to:
maintain a second counter, wherein the second counter tracks a number of accesses made to a second set;
responsive to evicting a second clean victim from the second set:
drop the second clean victim responsive to detecting the second counter is less than the first threshold; and
write back the second clean victim to the lower-level cache responsive to detecting the second counter is greater than the first threshold.

10. The cache as recited in claim 9, wherein the cache control unit is further configured to decrement the first and second counters by a predetermined amount responsive to determining a number of accesses made to the cache has exceeded a second threshold.

11. The cache as recited in claim 8, wherein the cache control unit is further configured to:
maintain a second counter to track a number of outstanding requests of the cache;
check the value of the second counter prior to determining whether to drop or write back the first clean victim; and
write back the second clean victim to the lower-level cache responsive to detecting the second counter is less than a second threshold.

12. The cache as recited in claim 11, wherein responsive to detecting the second counter is greater than the second threshold, the cache control unit is configured to:
drop the first clean victim responsive to detecting the first counter is less than the first threshold; and
write back the first clean victim to the lower-level cache responsive to detecting the first counter is greater than the first threshold.

13. The cache as recited in claim 8, wherein the lower-level cache is a level three (L3) cache.

14. The cache as recited in claim 8, wherein the lower-level cache is a memory controller cache.

15. A method comprising:
determining whether a thrash condition is present for a first set of a set associative cache responsive to evicting a first clean victim from the first set;
dropping the first clean victim responsive to determining the thrash condition is present for the first set; and
writing back the first clean victim to a lower-level cache responsive to determining the thrash condition is not present for the first set.

16. The method as recited in claim 15, wherein determining whether a thrash condition is present for the first set comprises determining whether a first access counter corresponding to the first set is greater than a first threshold.

17. The method as recited in claim 16, wherein the first access counter tracks a number of accesses made to the first set.

18. The method as recited in claim 17, wherein a second counter tracks a number of accesses made to the entire set associative cache, wherein the method further comprising decrementing the first access counter by a predetermined amount responsive to detecting the second counter has exceeded a second threshold.

19. The method as recited in claim 18, wherein a third counter tracks a number of outstanding requests of the set associative cache, wherein the method further comprising writing back the first clean victim to the lower-level cache responsive to determining the third counter is less than a third threshold.

20. The method as recited in claim 15, further comprising:
determining whether a thrash condition is present for a second set of the set associative cache responsive to evicting a second clean victim from the second set;
dropping the second clean victim responsive to determining the thrash condition is present for the second set; and
writing back the second clean victim to the lower-level cache responsive to determining the thrash condition is not present for the second set.

* * * * *